United States Patent
Klier et al.

(10) Patent No.: US 7,441,958 B2
(45) Date of Patent: Oct. 28, 2008

(54) WELDED COLLAR BEARING METHOD FOR PRODUCING WELDED COLLAR BEARINGS AND A DEVICE FOR CARRYING OUT SAID METHOD

(75) Inventors: Hans-Jürgen Klier, Taunusstein-Bleidenstadt (DE); Klaus Kirchhof, Niedernhausen (DE)

(73) Assignee: Federal-Mogul Wiesbaden GmbH & Co., Wiesbaden (DE)

( * ) Notice: Subject to any disclaimer, the term of this patent is extended or adjusted under 35 U.S.C. 154(b) by 360 days.

(21) Appl. No.: 10/381,769

(22) PCT Filed: Oct. 1, 2001

(86) PCT No.: PCT/DE01/03762

§ 371 (c)(1),
(2), (4) Date: Dec. 15, 2003

(87) PCT Pub. No.: WO02/29269

PCT Pub. Date: Apr. 11, 2002

(65) Prior Publication Data

US 2005/0223546 A1    Oct. 13, 2005

(51) Int. Cl.
*F16C 33/10* (2006.01)
*B21D 53/10* (2006.01)

(52) U.S. Cl. .................. 384/288; 384/273; 384/501; 29/898; 29/898.041

(58) Field of Classification Search .......... 29/898.09, 29/898, 724, 725, 898.041, 898.054; 384/288, 384/273, 501, 502, 267, 268, 270, 271, 898.041, 384/898.054

See application file for complete search history.

(56) References Cited

U.S. PATENT DOCUMENTS

| 1,656,125 A | * | 1/1928 | Neuenfelt | 384/276 |
| 1,922,304 A | * | 8/1933 | Klocke | 384/296 |
| 3,149,405 A | * | 9/1964 | Dolan | 29/898.054 |

(Continued)

FOREIGN PATENT DOCUMENTS

DE    25 28 576    1/1976

(Continued)

OTHER PUBLICATIONS

Messler, Jr., Robert W, "Principles of Welding Processes, Physics, Chemistry, and Metallurgy" Wiley & Sons, 1999, pp. 208-210.*

(Continued)

*Primary Examiner*—Essama Omgba
(74) *Attorney, Agent, or Firm*—Robert L. Stearns; Dickinson Wright PLLC

(57) ABSTRACT

A collar bearing comprising a bearing shell and at least one thrust washer, whereby the at least one thrust washer is fixed on an outer convex circumferential surface of the bearing shell to define a joint site that extends between the convex outer circumferential surface of the bearing shell and a concave inner circumferential surface of the thrust washer, the at least one thrust washer being welded along a weld seam to the bearing shell such that the weld seam extends axially between an outer thrust facing and an opposite inner surface of the at least one thrust washer, and the weld seam extends over only a part of the joint site.

12 Claims, 10 Drawing Sheets

U.S. PATENT DOCUMENTS

Figure 1:
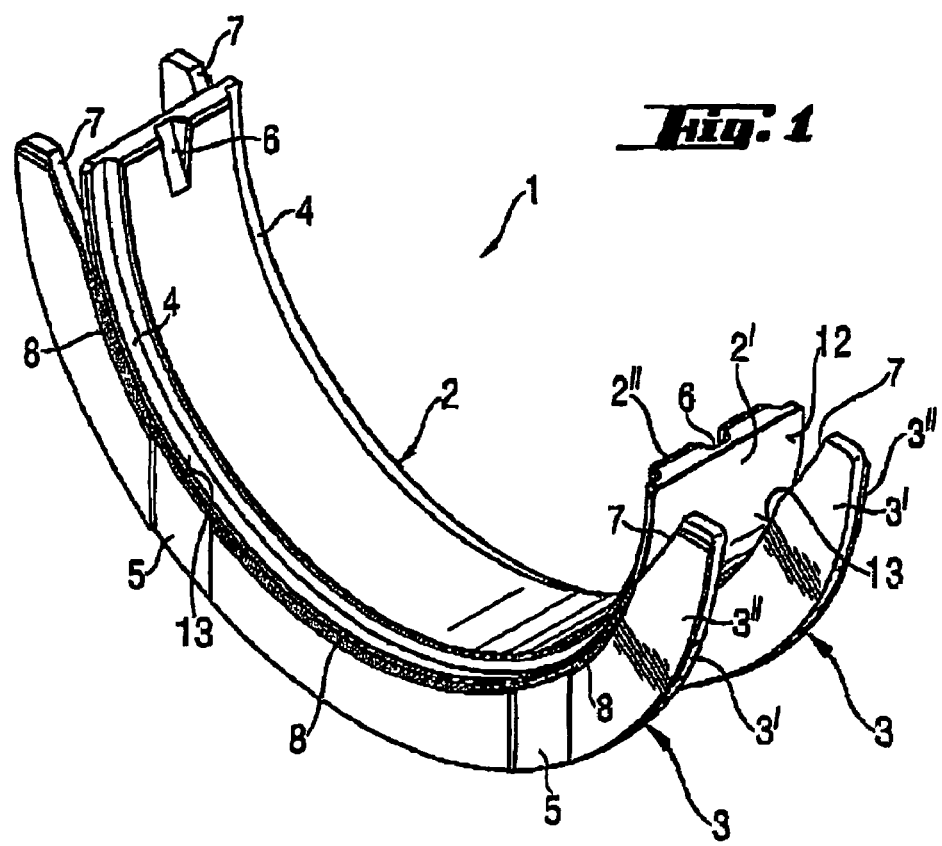

| | | | | |
|---|---|---|---|---|
| 3,199,173 | A * | 8/1965 | Lefevre | 29/898.054 |
| 3,319,535 | A | 5/1967 | Holcombe | |
| 3,624,881 | A * | 12/1971 | Brown et al. | 419/8 |
| 3,713,714 | A * | 1/1973 | Hill et al. | 384/294 |
| 4,073,483 | A * | 2/1978 | Smith | 269/25 |
| 4,288,895 | A * | 9/1981 | Campbell | 29/898.054 |
| 4,326,118 | A * | 4/1982 | Smith | 219/121.63 |
| 4,533,261 | A * | 8/1985 | Losio | 384/296 |
| 4,644,624 | A * | 2/1987 | Fontana | 29/898.041 |
| 4,652,150 | A * | 3/1987 | New | 384/275 |
| 4,702,624 | A * | 10/1987 | Fontana | 384/294 |
| 4,714,356 | A * | 12/1987 | Damour et al. | 384/275 |
| 4,845,817 | A * | 7/1989 | Wilgus | 29/898.054 |
| 5,299,490 | A | 4/1994 | Harrer et al. | |
| 5,462,365 | A | 10/1995 | Brandt | |
| 6,357,341 | B1 | 3/2002 | Watanabe et al. | |
| 6,916,117 | B2 * | 7/2005 | Mayer | 384/288 |
| 6,921,210 | B2 * | 7/2005 | Welch et al. | 384/294 |
| 7,101,086 | B2 * | 9/2006 | Klier | 384/273 |
| 7,134,793 | B2 * | 11/2006 | Thompson et al. | 384/294 |
| 7,258,489 | B2 * | 8/2007 | Welch et al. | 384/273 |

FOREIGN PATENT DOCUMENTS

| | | | |
|---|---|---|---|
| DE | 34 25 180 A1 | | 1/1985 |
| DE | 4031837 | * | 4/1991 |
| DE | 198 23 316 A1 | | 12/1999 |
| DE | 199 24 854 | | 7/2000 |
| EP | 0 171 825 A1 | | 2/1986 |
| EP | 0 385 390 A1 | | 9/1990 |
| FR | 2425017 | * | 3/1980 |
| GB | 1168914 | * | 10/1969 |
| GB | 1512782 | * | 6/1978 |
| GB | 2 347 194 A | | 8/2000 |
| JP | 49066779 | | 12/1972 |
| JP | 51002638 | | 7/1977 |
| JP | 61193788 | | 8/1986 |
| JP | 64069819 | | 3/1989 |
| JP | 01271080 | | 10/1989 |
| JP | 63089518 | | 1/1990 |
| JP | 07136787 | | 5/1995 |
| JP | 11108038 | | 4/1999 |
| JP | 2000-094177 | * | 4/2000 |
| JP | 2000094164 | | 4/2000 |
| JP | 2003-080393 | * | 3/2003 |
| WO | 9317250 | | 9/1993 |

OTHER PUBLICATIONS

"Welding Handbook" 6th ed. Section 1 Ed. Arthur L. Phillips. American Welding Society, 1968, pp. 3.54-3.55 & 5.11-5.13.*

Lindberg, Roy A. & Braton, Norman R. "Welding and Other Joining Processes" Allyn and Baon, Inc., 1976, pp. 380-385.*

Japanese Official Action, Issued Mar. 22, 2007, 5 Pages.

* cited by examiner

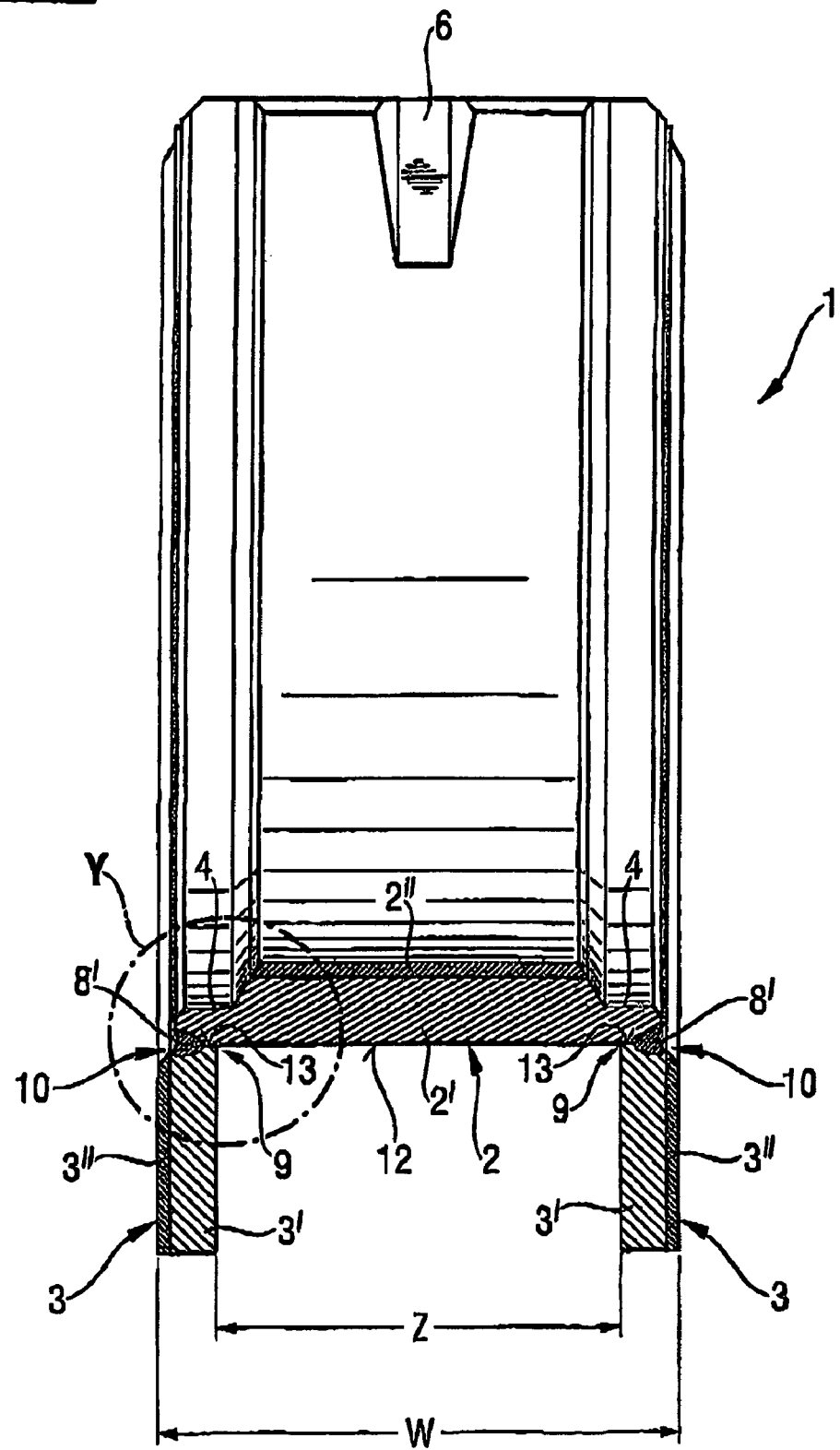

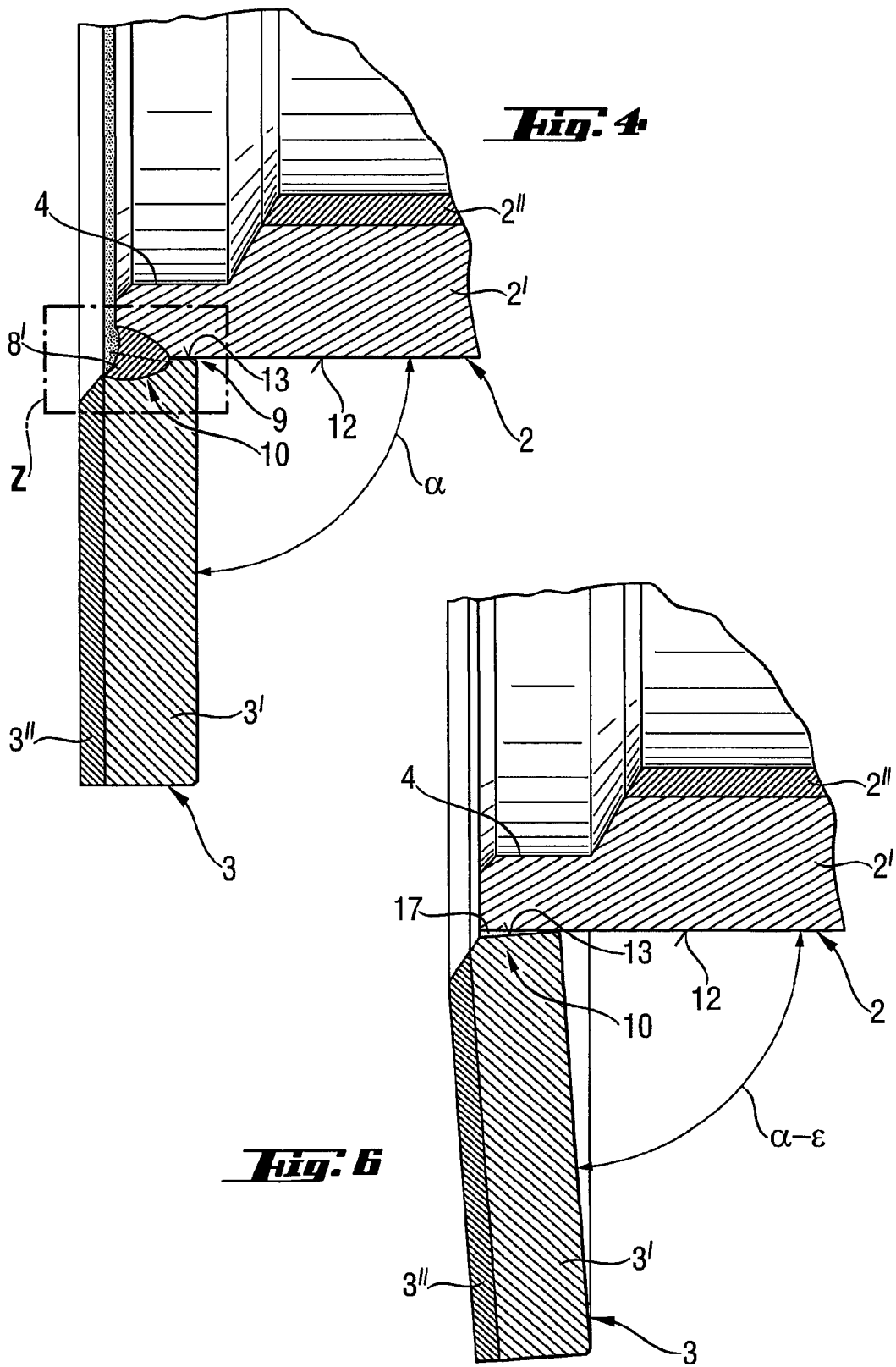

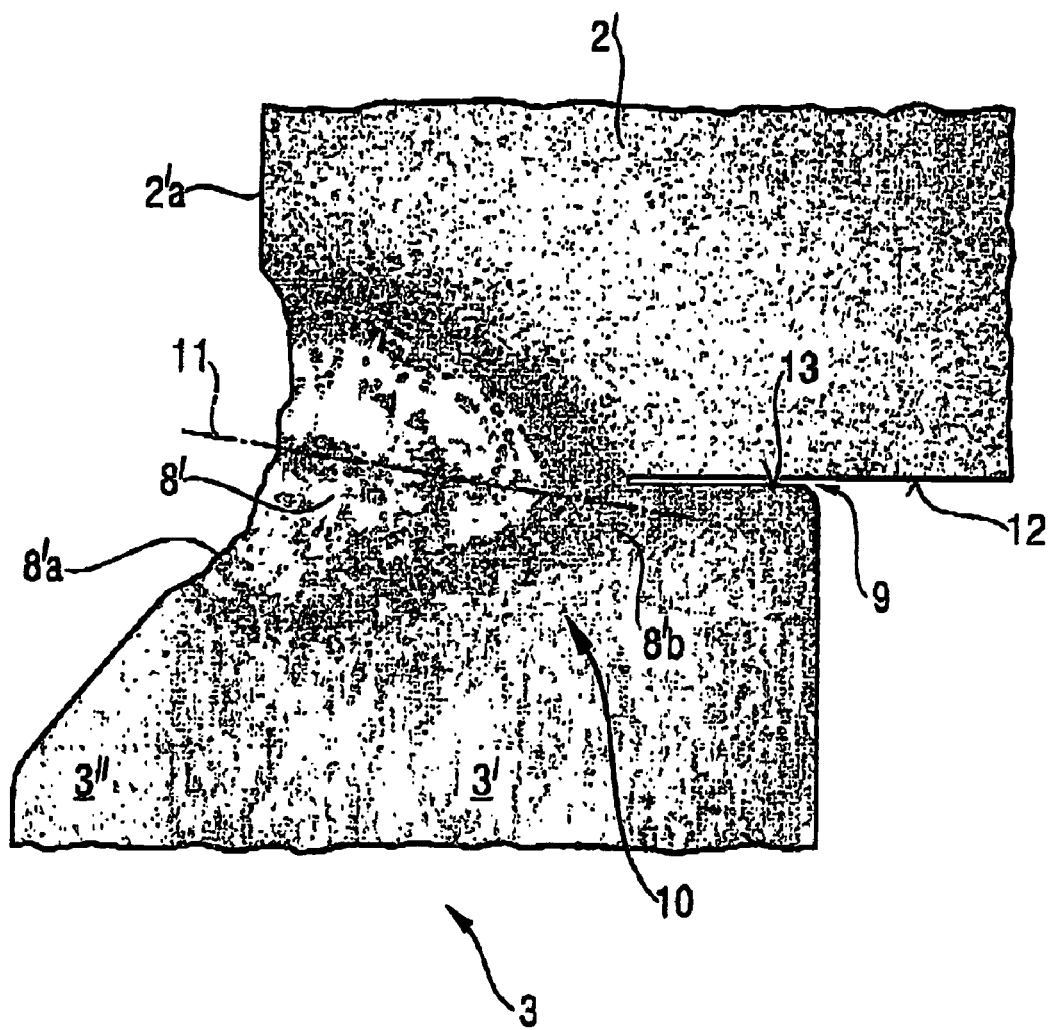

WELDED COLLAR BEARING METHOD FOR PRODUCING WELDED COLLAR BEARINGS AND A DEVICE FOR CARRYING OUT SAID METHOD

BACKGROUND OF THE INVENTION

1. Technical Field

The invention relates to a flange bearing having a bearing shell and at least one thrust washer, wherein the thrust washer, of which there is at least one, is attached to an outer circumferential surface of the bearing shell.

The invention also relates to a method of producing a flange bearing having a bearing shell and at least one thrust washer, wherein the thrust washer, of which there is at least one, is attached to an outer circumferential surface of the bearing shell.

The invention also relates to a clamping device, in particular a clamping device for performing the above-mentioned production method.

2. Related Art

For the purposes of the present invention, the term "flange bearing" is used as a collective term for flange bearing half shells and bushings, such that the bearing shell may be understood to mean both a bearing half shell and a cylindrical or tubular bushing, wherein the thrust washer is annular or takes the form of a ring segment, corresponding to the bearing shell. If the thrust washer takes the form of a ring, as a rule a continuous ring or an almost continuous ring with one joint is provided.

Such flange bearings are used for numerous applications, in particular for bearing-assisted mounting of heavily loaded, fast-rotating shafts requiring wear-free mounting, such as the crankshaft and/or camshaft of an internal combustion engine. These flange bearings have a bearing shell and at least one thrust washer, which is attached to the left- and/or right-hand edge of the outer circumferential surface of the bearing shell.

The bearing shell serves to absorb radial bearing forces, which are introduced via the shaft rotating in the bearing shell, whereas the rust washer, of which there is at least one, serves to absorb axial forces. If there is a need to absorb axial forces in both directions of the shaft two thrust washers have to be provided, since each thrust washer is in a position only to absorb the forces directed towards its overlay. Cheeks are provided on the shaft, by means of which the shaft is supported on the thrust washer, of which there is at least one.

Due to the right-angle bends in the crankshaft, the bearings for mounting the crankshaft in the crankcase are as a rule divided, wherein in principle continuous bearings and dismantlable crankshafts could also be used.

The flange bearings conventionally used for axial and radial mounting of a crankshaft consist of a semicircular bearing shell and at least one corresponding thrust washer, which is attached to the outer circumferential surface on the end face of the bearing shell to absorb the axial bearing forces. Two such flange bearings make a cranks bearing. They are accommodated in a bearing bore arranged in the crankcase, which bearing bore is likewise divided, each part being semicircular.

In each case, a semicircular bearing shell is accommodated by a corresponding semicircular recess in the so-called bearing saddle or beating cover, wherein, in addition, at least one further recess has to be provided for accommodating and fixing the thrust washer, of which there is at least one.

The requirement to provide recesses for accommodating the thrust washers is a consequence of the fact that the thrust washers are as a rule connected only loosely or non-permanently to the bearing shell or multipart flange bearings are used, in which the bearing shell and at least one thrust washer are mounted separately in the crankcase.

In contrast to the two-part flange bearings for mounting a crankshaft, one-piece flange bearings are conventionally used in internal combustion engines to mount camshafts. These flange bearings comprise a tubular bushing, on the end face of which there is arranged a thrust washer. In principle, the flange bearings have only one thrust washer, since they are press-fitted into the bearing bore accommodating them and thus have to have one side which is accessible and not provided with a thrust washer, thereby allowing such an assembly process. To construct a bearing which may absorb axial forces in both directions of the camshaft, as a rule two bushings are provided for each bearing, wherein one bushing is press-fitted from the left and one from the right into the bearing bore.

DE-OS 25 28 576 discloses a flange bearing which comprises a semicircular bearing shell and a thrust washer connected with said bearing shell. Therein, both the semicircular bearing shell and the thrust washer consist of a backing member and a facing applied to the backing member. The bearing shell backing member is connected to the thrust washer backing member by spot welding at localized points.

One of the backing members preferably comprises radially directed tabs, which form the localized points for the weld joint between the backing members. The tabs are as a rule located on the thrust washer backing member, slots being formed in the bearing shell backing member which each accommodate one tab.

Welding of the tabs introduced into the slots to the end face of the bearing shell forms a rigid connection. The purpose of this connection is primarily to allow simple, preferably mechanized, assembly, whereas such a weld joint does not serve the purpose of ensuring a stable connection between bearing shell and thrust washer during operation of the internal combustion engine.

Since the connection is restricted to localized points, large forces act at these points during operation, which may possibly lead to breakage of the weld points. This is again dealt with in the design of the crankcase by providing recesses on the bearing blocks for accommodating the thrust washers. Should the weld joint then become fatigued during operation, the recess may take over from the weld joint the task of mounting and fixing the thrust washers in the crankcase.

A flange bearing which is very similar to this flange bearing and in which the bearing shell is likewise welded to the trust washers is disclosed in DE 34 25 180 A1.

The thrust washers designated thrust half rings are connected to the bearing shell by projection welding or by capacitor discharge welding. The thrust half rings are made in such a way that the radius of their inner circumference corresponds in a central area to the radius of the outer circumference of the bearing shell. This central area, which serves as an attachment area for the weld joint arrangement, is adjoined to the right and left by lateral areas in which the inner circumference of the thrust half rings has a larger radius than the radius of the outer circumference of the bearing shell.

The half rings preferably comprise protrusions for performing projection welding and the bearing shell preferably comprises countersunk seat areas for accommodation and welding-on of the thrust half rings.

The finished flange bearing has a bearing shell in which the half rings are connected with the end face of the bearing shell by spot welding. However, it has emerged that, during operation of the internal combustion engine, the thrust washers become detached due to the axial forces introduced by the crankshaft. This is accepted, however, since the problem which this flange bearing was developed to solve consisted in providing a bearing shell in which the connection between it and the thrust flanges was sufficiently firm to allow mechanized mounting (c.f. DE 34 25 180 A1, page 5, line 10 ff).

As is the case with the flange bearings of the first-mentioned published patent application, recesses have also to be provided here to accommodate the thrust washers in the bearing blocks of the crankcase. This results in a complex design and cost-intensive manufacture of the crankcase. In addition, the flange bearings welded in accordance with the prior art have to be post-machined, since, as a result of warping caused by weld heat, their thrust washers are not arranged as required, perpendicularly to the bearing shell.

The thrust washers arranged at a slight angle have the consequence that the sliding surface located thereon for absorbing the axial bearing forces and for supporting the crankshaft via the crank cheeks is wise not arranged perpendicularly to the crank axis, but rather at an angle thereto. As a result, the thrust washers are not loaded evenly over their entire sliding surface, but rather only partially, which may lead to overloading, resulting in material abrasion and bearing destruction, and also to vibration breakage of the trust washer.

In addition to the welded flange bearings according to the prior art, in which the weld joint does not as a rule constitute a permanent weld joint, but merely one which simplifies mounting, built-up flange bearings are also a possibility. Such a built-up flange bearing shell is disclosed in DE 199 24 854 C1. With this flange bearing, the semicircular bearing shells comprise retaining recesses in the area of an axial rim portion of the radial bearing part.

The inwardly projecting retaining tongues arranged on the support washer, designated axial bearing part, are introduced into these retaining recesses. At least one of the retaining recesses is open at the edge and has a bendable web, delimiting the recess axially, which is bent round after insertion of the thrust washer into the bearing shell and forms a retaining tongue undercut and thus secures the thrust washer to the bearing shell. However, such interlockingly assembled flange bearings exhibit low dimensional accuracy due both to the relatively loose, interlocking connection and to the deformation to be effected to produce the interlocking connection. Furthermore, effecting an interlocking connection by deforming the components is itself relatively time-consuming and thus expensive.

A flange bearing in which the bearing shell consists of a tubular bushing, to which there is welded by laser welding a circular ring-shaped thrust washer in the form of a flange, is disclosed in DE 198 23 316 A1.

Such bushings are used to bearing-mount camshaft in internal combustion engines. In principle, these flange bearings have only one thrust washer, since they are press-fitted into the bearing bore accommodating them and thus have to have one side which is accessible and not provided with a thrust washer. To construct a beg which may absorb axial forces in both directions of the camshaft as a rule two bushings are provided for each by, wherein one bushing is press-fitted from the left and one from the right into the bearing bore.

The weld joint generated between thrust washer and bushing is a permanent connection, which serves not only as a mounting aid but is also intended, moreover, to ensure fixing of the thrust washer in operation. Consequently, when such bushings are used, no recess has to be provided to accommodate the thrust washer in the bearing.

A disadvantage of the thus constructed flange bearings, produced according to the prior art, is shape inaccuracy, however. Shape inaccuracy is again caused by the heat introduced during the welding process and the thermal stresses resulting during cooling of the assembled flange bearing, which cause the thrust washer on the finished, cooled flange bearing not to stand perpendicular to the axis of the flange bearing, as desired, but to be warped, i.e. during the cooling process the thrust washer tilts away from the perpendicular in the direction of the weld seam. For this reason, the thrust washers have to be thoroughly post-machined, in order to be able to comply with manufacturing tolerances. This increases the number of manufacturing operations and thus the production costs.

Another possibility, which would allow the recesses for accommodating the thrust washers to be dispensed with, is provided by a method by which the flange bearings are made in one piece. This method starts with a specially formed backing member faced with a friction-reducing material. Shaping of the layered backing member to produce a flange bearing with bearing shell and at least one thrust washer requires numerous complex shaping operations, however, which render a flange bearing constructed in one piece in this way an extremely expensive product. Consequently, the one-piece construction of the flange bearing is not expedient either, if it is desired to provide a good value flange bearing in which the bearing shell is connected permanently and stably with the at least one thrust washer.

The prior art expounded demonstrates unequivocally the problems facing the bearing manufacturer who wishes to provide a cost-effective bearing. Flange bearings in which the bearing shell and the thrust washer, of which there is at least one, are not connected at all, or are connected together only loosely (DE 199 248 54 C1) or not permanently (DE 34 25 180 A1), for example by a weld joint serving merely as a mounting aid, require the provision of recesses for accommodating the thrust washer in the bearing block.

Firmly connected, for example built-up flange bearings, as disclosed by DE 19 823 316 A1, are cost-intensive due the relatively complex production process.

All bearings require post-machining after effecting the interlocking or material connection.

Although one-piece flange bearings render unnecessary the recess for accommodating the thrust washer, they are themselves cost-intensive and thus do not provide any real alternative to the flange bearings known from the prior art.

Against this background, it is the object of the invention to provide a flange being having a bearing shell and at least one thrust washer connected to the bearing shell, in which the bearing shell is connected permanently with the at least one thrust washer, thereby rendering dispensable the recess for accommodating the at least one thrust washer to be provided according to the prior art, wherein the flange bearing is intended to provide the best possible value, in particular to do away with post-machining due to an inclined, non-perpendicular thrust washer.

Another sub-object of the present invention is to provide a method of producing a flange bearing having a bearing shell and at least one thrust washer, with which the bearing shell is permanently connected to the thrust washer, thereby rendering dispensable the recesses for accommodating the at least one thrust washer and allowing the most economic production possible of such flange bearings.

Another sub-object of the present invention is to provide a clamping device, in particular a clamping device for performing the above-mentioned production method.

SUMMARY OF THE INVENTION

The first sub-object is achieved by a flange bearing of the generic type, in which, at a joint site which is arranged between the outer circumferential surface of the bearing shell and an inner circumferential surface segment of the thrust washer, the at least one thrust washer is welded to the bearing shell in such a manner as to remain there permanently during operation, wherein the weld seam extends axially only over a part of the joint site and without post-machining the angle cc between the at least one thrust washer and the outer circumferential surface of the bearing shell assumes a value of 90°±50'.

The flange bearing according to the invention provides a permanent weld joint between the bearing shell and the at least one thrust washer, wherein the weld seam is arranged between the inner circumferential surface and the outer circumferential surface of the bearing shell. In the case of such a flange bearing, the at least one thrust washer of the bearing shell is held and fixed by means of the weld seam formed, for which reason no recesses have to be provided to accommodate the at least one rust washer in the crankcase, thereby achieving the first part of the first sub-object of the object to be achieved. The thrust washers are attached to the bearing shell so as to remain permanent during operation, so to speak.

The weld seam is explicitly not provided purely as a mounting aid, but rather as a permanent weld seam, wherein the weld seam extends axially only over part of the joint site.

If the weld seam of an externally welded flange beating were to extend axially over the entire joint site, in particular to exit at the back of the thrust washer, post-machining of the outer circumferential surface of the bearing shell would be necessary, since the bearing shell is accommodated in the area behind the at least one thrust washer in the bearing bore provided therefor and exact seating of the bearing shell can only be ensured if the bearing shell exhibits close tolerances in the relevant circumferential surface area.

However, even if the weld seam does not exit at the back of the at least one thrust washer, post-machining may be rendered necessary by a weld seam which is too long in the axial direction, since the heat input during the welding process, by the very nature thereof, may lead to a structural change and/or material precipitation, in particular in the area of the circumferential surface of the bearing shell.

Material precipitation becomes noticeable, for example, in droplet-like deposits located on the circumferential surface of the bearing shell. These initially liquid deposits, which cool together with the rest of the flange beating after the welding process and change into a hard deposit, have to be removed by post-machining, in order to ensure good seating of the flange bearing in the bearing bore.

In addition, the flange bearing according to the invention is so constructed, from the beginning, that the at least one thrust washer forms an angle $\alpha$ of 90°±50' with the outer circumferential surface of the bearing shell. Since the trust washer is already perpendicular to the bearing shell after the welding process or exhibits only a tolerable deviation from the ideal value $\alpha_{ideal}$=90°, it is not necessary to post-machine the thrust washer to correct the faulty position of the thrust washer.

The perpendicular or virtually perpendicular position of the thrust washer is effected by deflecting or inclining the thrust washer during the welding process, wherein this measure is explained in full detail below in the context of the production method according to the invention, which has still to be described.

Embodiments of the flange bearing are advantageous in which the angle $\alpha$ assumes a value of 90°±35', preferably a value of 90°±25'. These embodiments are advantageous since they ever more closely approach the ideal value $\alpha_{ideal}$=90° and thus correspond ever better to the strictest requirements with regard to the dimensional and shape accuracy of the flange bearing.

Embodiments of the flange bearing are advantageous in which the weld seam has a back and a front and on the back of the weld seam there is additionally formed a substantially parallel gap between the outer circumferential surface of the bearing shell and the inner circumferential surface segment of the thrust washer.

It is assumed that the outer circumferential surface of the bearing shell and the inner circumferential surface segment of the thrust washer are substantially cylindrical and an annular air gap is located between the bearing shell and the thrust washer positioned loosely on said bearing shell. The annular air gap may also exhibit a width of a only few micrometers, as is the case for example when a clearance fit is provided between bearing shell and thrust washer.

The above-described embodiment is advantageous with regard to the production process, since the thrust washer may be inclined or prestressed for welding with lower forces than if the thrust washer is seated firmly on the bearing shell. A certain mobility of the thrust washer on the bearing shell is additionally favorable for movement of the thrust washer as a result of cooling of the weld joint.

A substantially parallel gap at the back of the weld seam means that the thrust washer is substantially perpendicular to the outer circumferential surface of the bearing shell, i.e, the angle $\alpha$ assumes its preferred value.

Moreover, the construction of a gap is an indicator that the weld seam extends only over part of the joint site, which leads to the above-mentioned advantages.

Embodiments of the flange bearing are advantageous in which the radius of the inner circumferential surface segment of the thrust washer corresponds to the radius of the outer circumferential surface of the bearing shell substantially over the entire circumference of the thrust washer. This embodiment has a large usable joint site, such that a weld seam may be formed virtually over the entire circumference of the thrust washer. This increases the stability of the flange bearing and ensures secure, permanent connection of the at least one thrust washer to the bearing shell.

Embodiments of the flange bearing are advantageous in which the thrust washer, of which there is at least one, is laser-welded to the bearing shell. Generation of the weld seam arranged between thrust washer and bearing shell by laser welding has a positive effect on the flange bearing, due to the special properties of laser welding, and results in a high-quality flange bearing.

On the one hand, laser welding is a welding process which functions without the introduction of additional welding material and contents itself merely with heating of the parts to be joined. Due to the lack of material input, the formation of an outwardly protruding weld seam is avoided, for which reason the sometimes troublesome outwardly protruding excess welding material does not have to be removed by post-machining.

In addition, laser welding allows purposeful punctiform heat input into the joint site, such that the areas adjoining the joint site, which are inevitably and undesirably heated too, may be kept as small as possible, thereby minimizing or preventing the risk of structural change in these areas and the risk of the bearing shell and the thrust washer changing their shape or geometric dimensions.

Embodiments of the flange bearing are advantageous in which the flange bearing is welded from the outside, such that the weld seam, which comprises a back and a front has its front on the side facing the thrust washer facing.

Flange bearings which consist of a bearing shell and two thrust washers arranged on said bearing shell may be manufactured more simply and cost-effectively if the weld seam or weld seams are produced from the outside. This embodiment also has advantages insofar as the circumferential surface of the bearing shell located at the back of the thrust washer is not affected by the welding process. As already mentioned, the flange bearing is accommodated in the bearing bore via the outer circumferential surface of the bearing shell, such that the circumferential surface is a locating surface which has as a rule to exhibit tight tolerances.

However, embodiments of the flange bearing may also be advantageous in which the flange bearing is welded on the inside, such that the weld seam, which comprises a back and a font, has its front on the side remote from the thrust washer facing.

This embodiment is advantageous for example in the case of flange bearings which are composed of a continuous tubular bearing shell, i.e. a bushing, and an annular thrust washer, i.e. a thrust ring. Due to the fact that only one thrust ring has to be welded on, the back of the thrust ring is also easily accessible, which cannot be assumed if two thrust rings are located on the bushing. Possible slight post-machining of the flange bushing, for example removal of weld seam material, is accepted, whilst the post-machining required according to the prior art is prevented here too as a result of the inclined position of the thrust ring.

Embodiments of the flange bearing are advantageous in which the bearing shell comprises at least one circumferentially encircling groove on an inner circumferential surface of the bearing shell, preferably at the edge thereof. Reduction of the cross-section of the bearing shell results in increased flexibility of the bearing shell, wherein precisely the preferred arrangement of the grooves at the edge of the bearing shell promotes resilience under dynamic axial forces introduced into the thrust washer.

Embodiments of the flange bearing are advantageous in which the bearing shell comprises at least one groove on an inner circumferential surface of the bearing shell, preferably in the middle thereof. This groove preferably extends in the circumferential direction, i.e. in the direction of crankshaft rotation, and serves as a lubricating oil reservoir accommodating lubricating oil.

In the case of a flange bearing with two thrust washers, embodiments are advantageous in which the two thrust washers extend circumferentially at least in part beyond the bearing shell.

Such thrust washers, which are arranged for example in the lower crankcase part, engage in the opposing upper case part and may thereby fix or center the upper crankcase part relative to the lower crankcase part.

Embodiments which are advantageous in the case of flange bearings with two flange bearing half shells, which each have a bearing shell and two thrust washers, are those in which the two thrust washers of each flange bearing half shell are beveled at their ends. Ends constructed in this way may serve as mounting aids.

Embodiments of the flange bearing are advantageous in which the thrust washer, of which there is at least one, comprises grooves in its outer surface, which grooves intersect with the outer surface in the manner of a secant. These grooves are necessary to form a load-bearing lubricant film on the sliding surface, i.e. the outer surface of the thrust washer, and to remove oil.

Embodiments of the flange bearing are advantageous in which the thrust washer, of which there is at least one, comprises punched out portions at its inner circumferential surface segment. In this case, however, the radius of the inner circumferential surface segment should preferably match the radius of the outer circumference of the bearing shell over substantially the entire inner circumferential surface segment.

In this embodiment, the thrust washer, of which there is at least one, and the bearing shell are not connected via a single continuous weld scam, but rather via a plurality of segmental weld seams each located between two punched-out portions. The punched-out portions increase the flexibility of the flange bearing.

The sub-object with regard to production of a flange bearing with a bearing shell and at least one thrust washer, wherein the at least one rust washer is attached to an outer circumferential surface of the bearing shell, is achieved by a method which is characterized in that the thrust washer, of which there is at least one, is welded permanently to the bearing shell at a joint site which is arranged between an outer circumferential surface of the bearing shell and an inner circumferential surface segment of the thrust washer, wherein the at least one thrust washer is deflected over its entire circumference at an angle $\alpha \pm \epsilon$ between the at least one thrust washer and the outer circumferential surface of the bearing shell, wherein $\alpha$ corresponds to the desired angle between the at least one thrum washer and the outer circumferential surface of the bearing shell and $\epsilon$ is the deflection angle which is selected in such a way that it is compensated after the welding process and cancellation of the deflection as a result of cooling.

The method according to the invention ensures maximum shape and dimensional accuracy.

For example, it allows the production of a flange bearing half shell equipped with two thrust washers, which fulfills the strictest requirements with regard to the interflange dimension Z and the cheek dimension W.

The interflange dimension Z, which describes the distance between the two thrust washes (see FIG. 3), is an extremely important dimension for a flange bearing, since the flange bearing is mounted in this area in a bearing bore or on a bearing block and tight tolerances have to be complied with in relation to the axial clearance of the flange bearing on the bearing block; for example, in the case of a clearance fit a tolerance window of between 20 and 80 μm may be set.

The dimensions should be constant over the height of the thrust washers, for which reason the thrust washers have to be arranged parallel to one another and perpendicularly to the circumferential surface of the bearing shell. Production of thrust washers oriented as perpendicularly as possible is impossible with the methods known from the prior art, such that post-machining of the inadequately perpendicular thrust washers is necessary.

Investigations have shown that the orientation of the thrust washers attached by welding changes again after cooling of the weld joint, because the thrust washers warp and change position due to the cooling and contracting weld seam.

According to the invention, this effect is taken into account during production by prestressing the thrust washer over its entire circumference by the deflection angle $\epsilon$, wherein the deflection angle is selected in such a way that it is compensated after welding and cancellation of the deflection due to cooling. The method according to the invention thus provides for compensation of the cooling effect by appropriate prestressing of the thrust washer.

In the context of prestressing, the thrust washer is tilted outwards if welding is performed from the inside, and is conversely tilted inwards if welding is performed from the outside.

The cheek dimension W, which denotes the axial spacing of the outer surfaces of the thrust washers (see FIG. 3), should likewise exhibit tight tolerances over the entire circumference and the height of the thrust washers. The method according to the invention is again expedient.

Method variants are advantageous in which the deflection angle $|\epsilon|$ is $\leq 60'$, preferably $\leq 50'$ or $\leq 40'$, in particular $\leq 30'$.

Method variants are advantageous in which at least one thrust washer is welded to the bearing shell over substantially the entire circumference of the thrust washer. This ensures a sufficiently firm connection of the bearing shell to the at least one thrust washer and high stability of the flange bearing.

Method variants are advantageous in which a laser welding method is used as welding method, wherein the laser welding beam is guided from one end of a weld seam to be formed to the other end. The advantages of this special welding method have been explained in relation to the advantageous embodiments of the flange bearing according to the invention.

Method variants are advantageous in which the laser welding beam is inclined inwards relative to the flange bearing axis by an angle $\beta$ of 10° to 30°, if the flange bearing is welded from the outside.

Inclination of the laser welding beam is primarily a protective measure with regard to the thrust washer facing applied to the thrust washer backing member, which facing could otherwise be attacked during a production process which welds the bearing shell and the at least one thrust washer from the outside, i.e. from the end face of the bearing shell.

To support this measure, the thrust washer facing is beveled or provided with a chamfer in the area of the inner circumferential surface segment of the thrust washer, such that access to the joint site relevant to the method is simplified.

Method variants are advantageous in which the laser welding beam is focused in such a way that the focal point is in front of the wedge-shaped gap, which is formed as a result of deflection of the thrust washer.

Because an albeit small annular air gap is formed between the bearing shell and the loosely positioned thrust washer, which air gap is substantially parallel if the outer circumferential surface of the bearing shell and the inner circumferential surface segment of the thrust washer are cylindrical, a wedge-shaped gap arises at the joint site upon adjustment of the thrust washer by the deflection angle $\epsilon$.

So that the parts to be joined are sufficiently heated in the area of the joint site, the laser beam needs to be sufficiently wide in the area of the joint site, which may be ensured for example in that the focal point of the laser beam lies in front of the wedge-shaped gap.

For the same reasons, however, method variants are likewise advantageous in which the laser welding beam is focused in such a way that the focal point lies in the wedge-shaped gap.

Method variants are advantageous in which the cross-section of the laser welding beam is larger than the width of the wedge-shaped gap. This advantageous development of the method according to the invention ensures that the area of the joint site is sufficiently heated.

Method variants are advantageous in which a protective gas is used. This protective gas has two functions. On the one hand, it serves, as in conventional welding methods using a protective gas, to prevent oxidation by displacing the oxygen at the joint site through introduction of the protective gas.

On the other hand, injection of a protective gas serves in specific cooling of the areas located in the vicinity of the joint site.

It has surprisingly emerged that even the direct introduction of protective gas into the joint site does not hinder formation of the weld seam itself, but advantageously opposes the undesired heating of the neighboring areas of the joint site.

Method variants are advantageous in which the flange bearing is welded from the outside, such that the weld seam, which comprises a back and a front, has its front on the side facing the thrust washer facing.

Likewise, methods are advantageous in which the flange bearing is welded from the inside, such that the weld seam, which comprises a back and a front, has its front on the side remote from the thrust washer facing.

The advantages of the latter two method variants have already been explained in the context of the explanation of the advantageous embodiments of the flange bearing according to the invention.

Method variants are advantageous in which the weld seam is of triangular cross-section.

The third sub-object is achieved by a clamping device for prestressing at least one thrust washer, which device comprises a receptacle, at least one clamping jaw and at least two clamping elements, and in which the receptacle comprises a first recess for accommodating a bearing shell, which may be clamped by means of a first clamping element, and the receptacle additionally comprises at least one second recess for accommodating the at least one thrust washer, wherein the recess is so constructed that the thrust washer may be prestressed by means of the at least one clamping jaw and a second clamping element over its entire circumference at an angle $\alpha \pm \epsilon$ between the at least one thrust washer and the outer circumferential surface of the bear shell, wherein $\alpha$ corresponds to the desired angle between the at least one thrust washer and the outer circumferential surface of the bearing shell and $\epsilon$ is the deflection angle which is selected in such a way that it is compensated after welding and cancellation of the deflection as a result of cooling.

THE DRAWINGS

Figure 2:
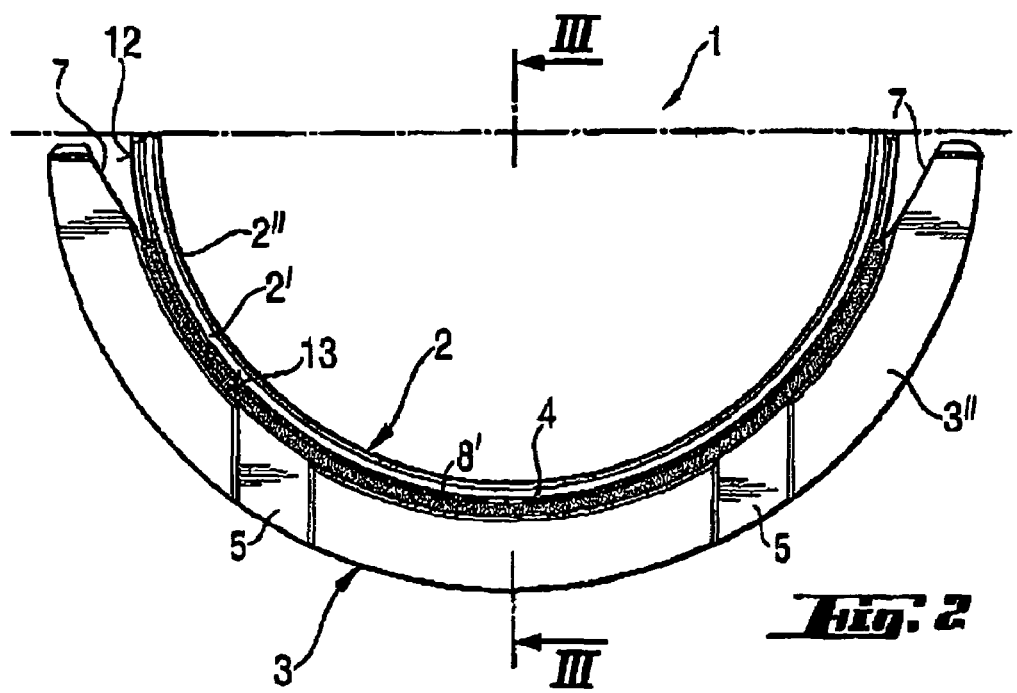
Figure 7:
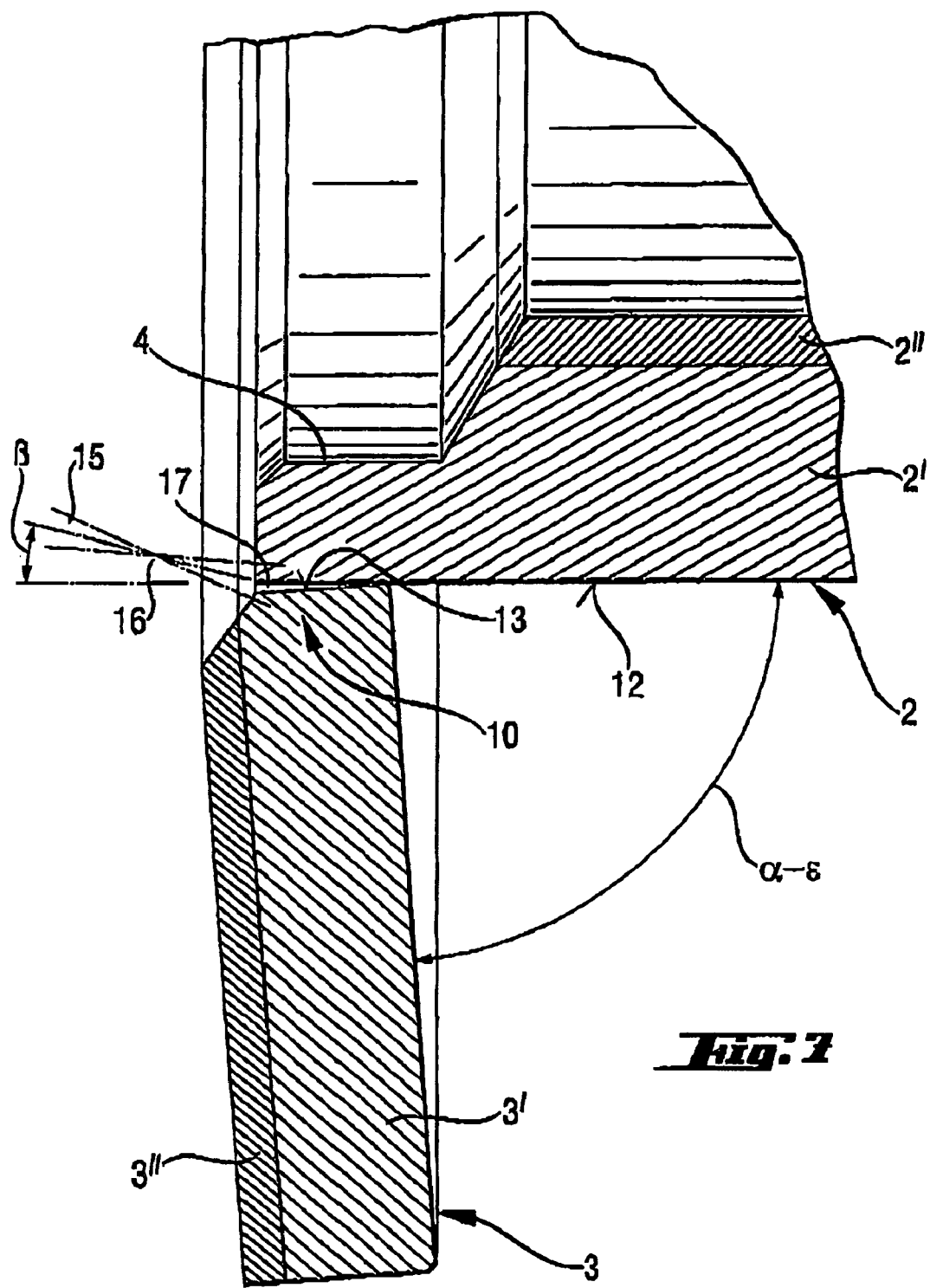
Figure 8:
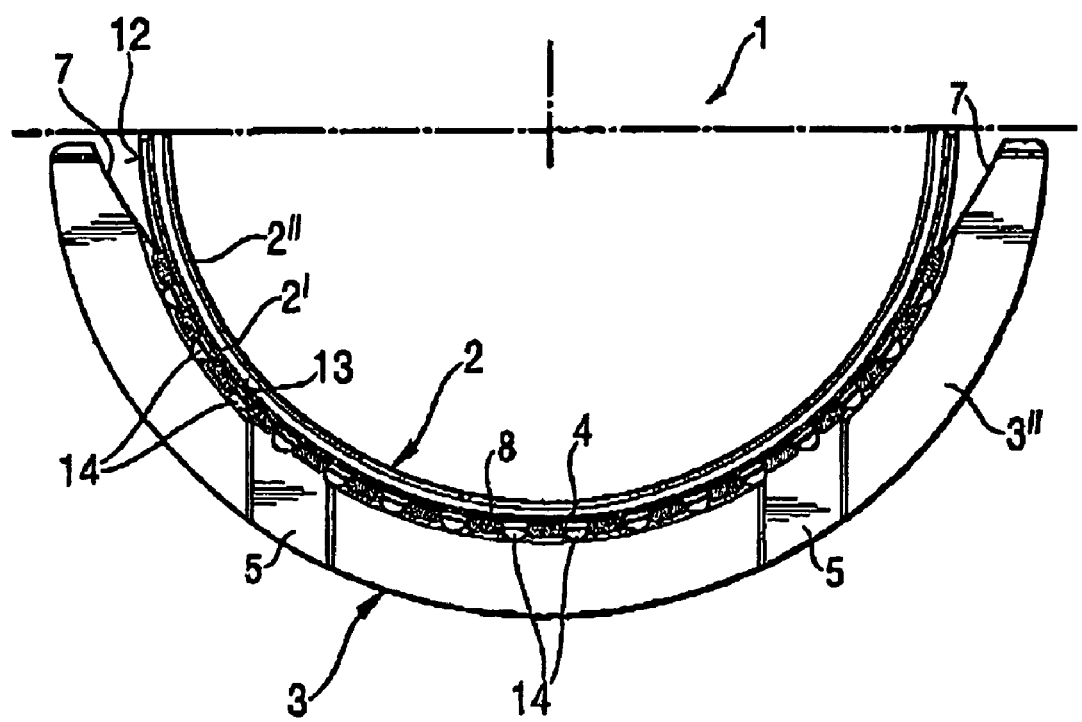
Figure 9:
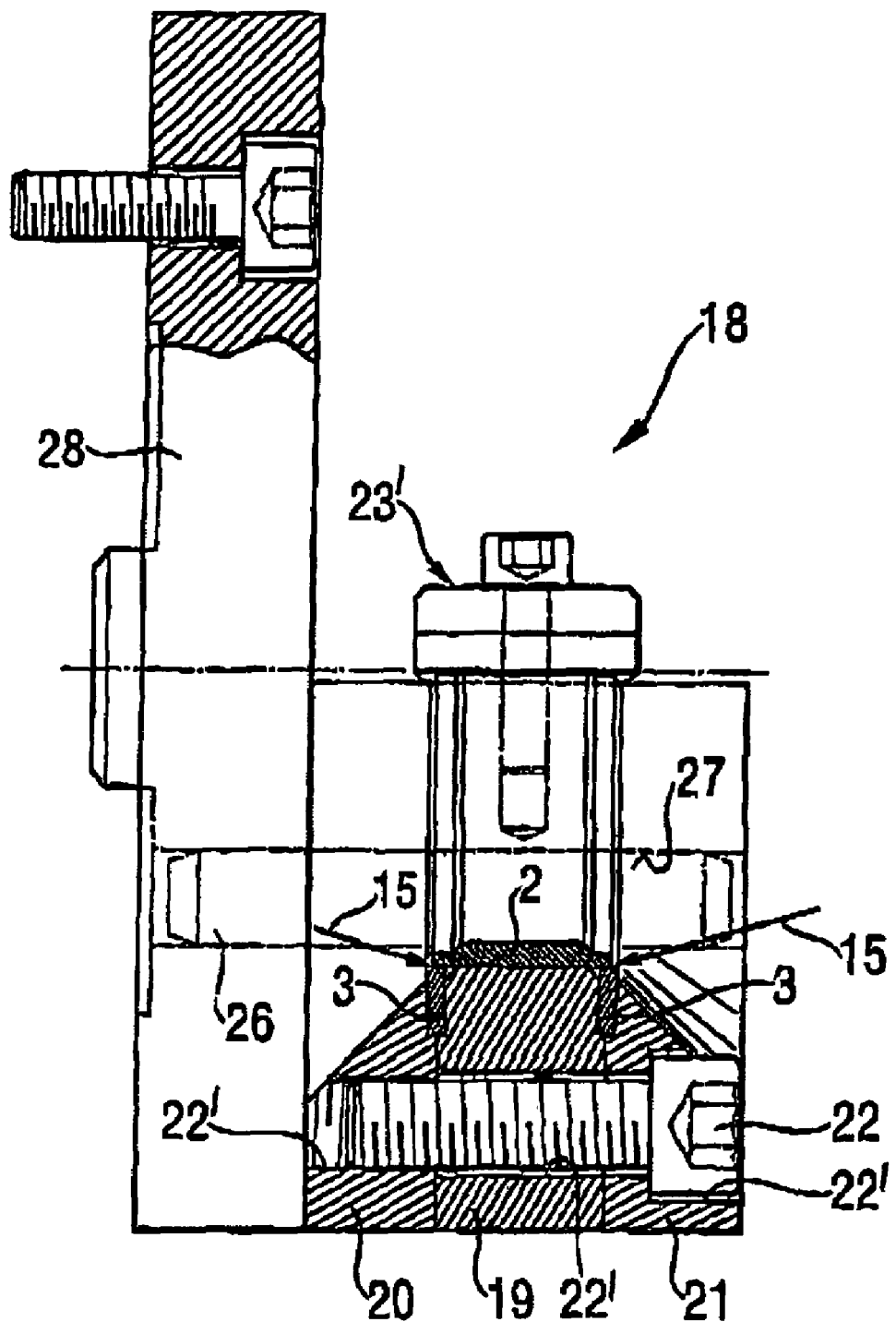
Figure 10:
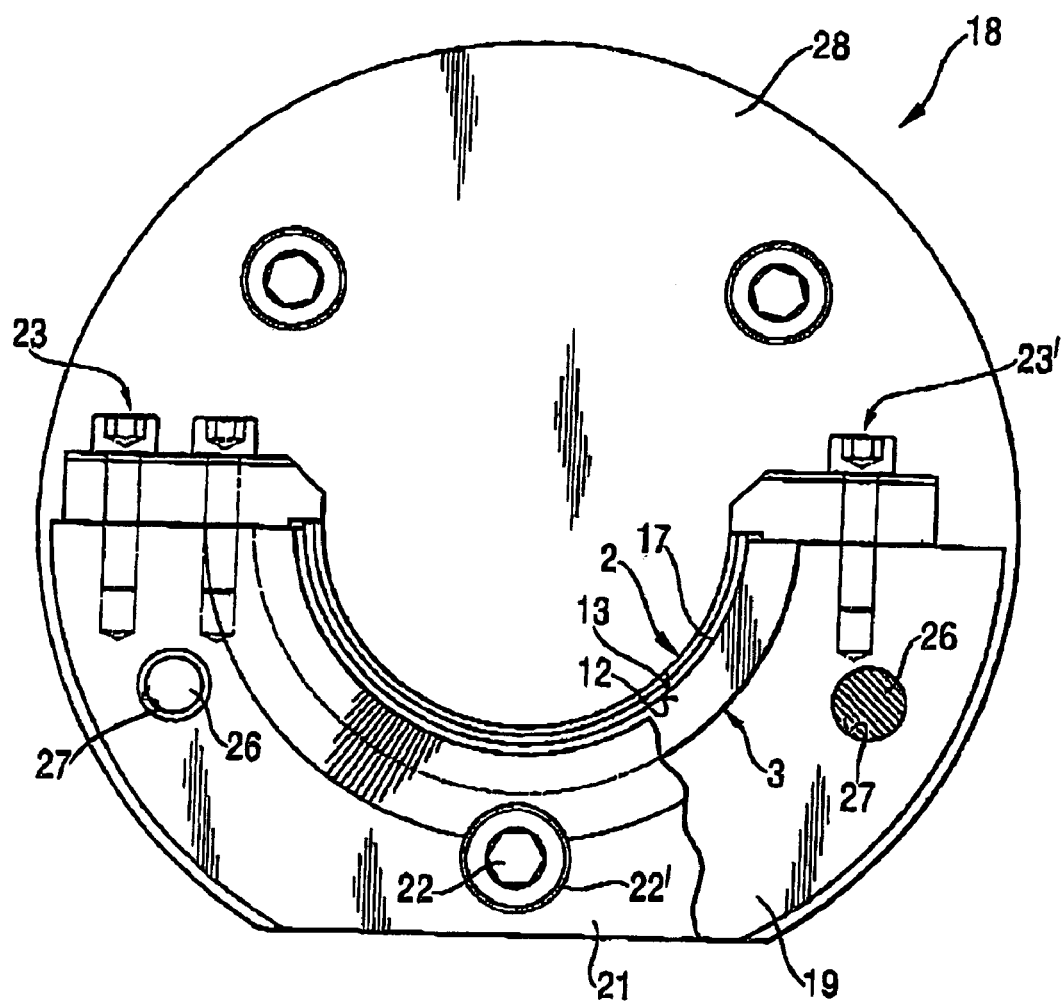
Figure 11:
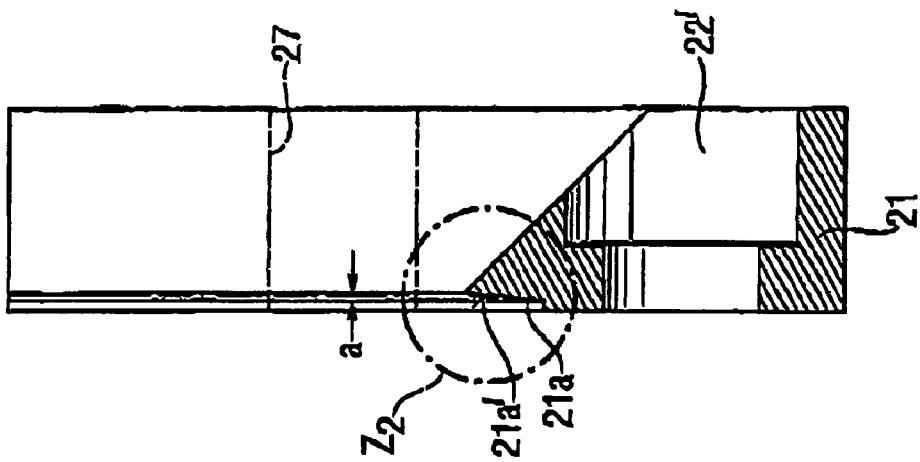
Figure 12:
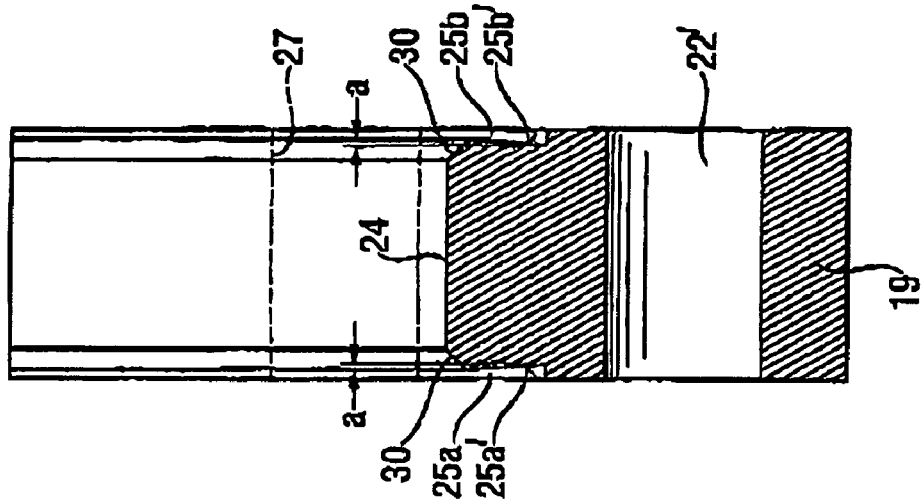
Figure 13:
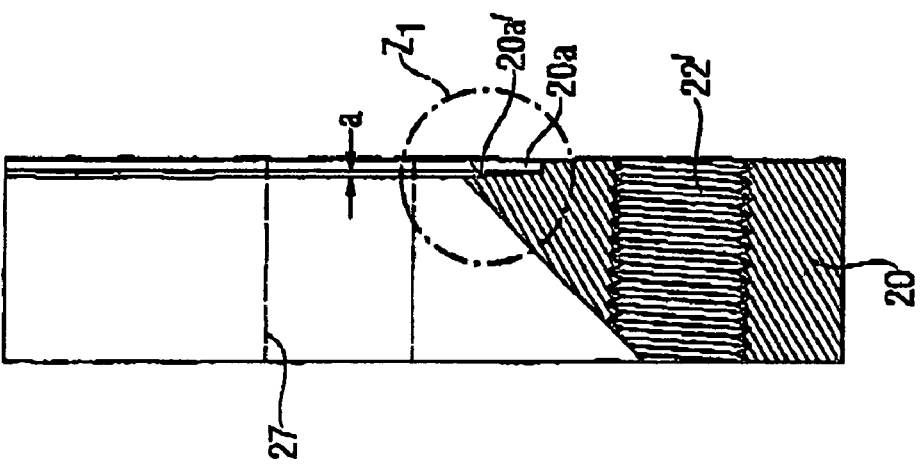
Figure 14:
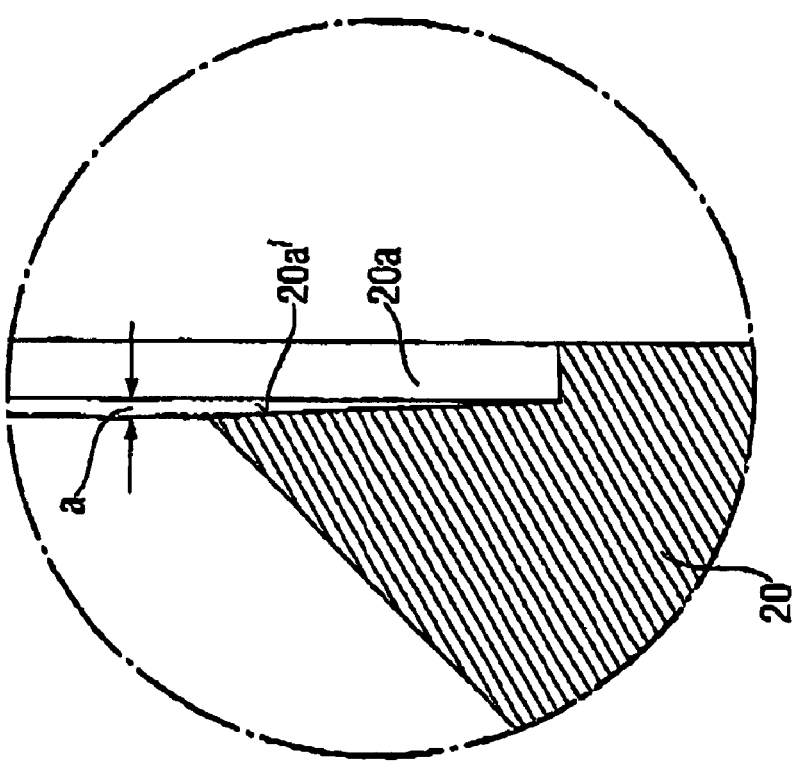
Figure 15:
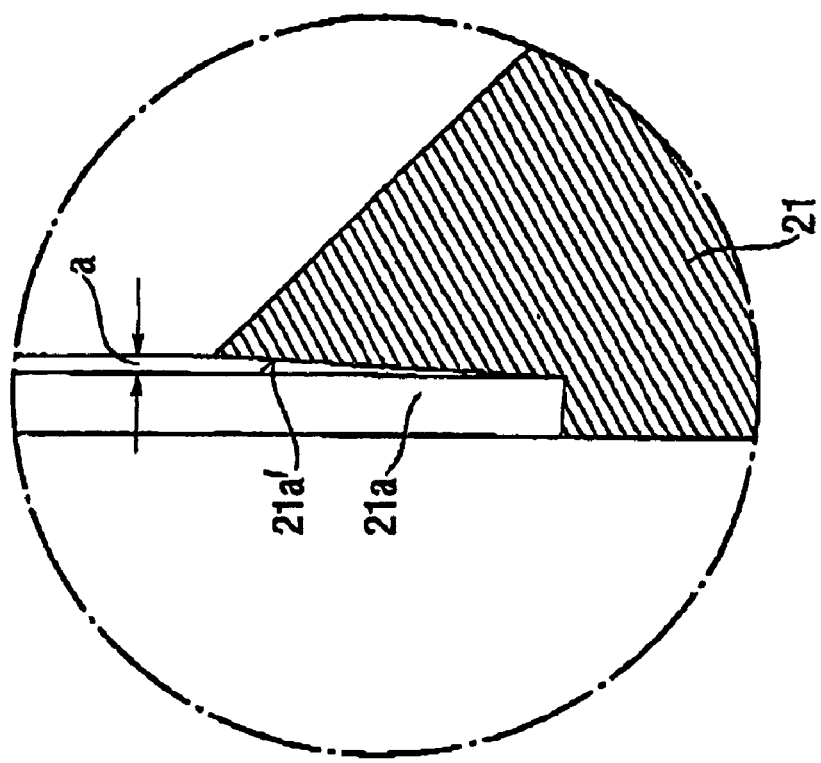

The invention is explained more fully below with reference to three exemplary embodiments according to FIGS. 1 to 9, in which:

FIG. 1 is a perspective representation of a first embodiment of a flange bearing in the form of a flange bearing half shell with a bearing shell and two thrust washers, FIG. 2 is a side view of a second embodiment of a flange bearing in the form of a flange bearing half shell with a bearing shell and two thrust washers, FIG. 3 is a view of the flange bearing half shell illustrated in FIG. 2 along section III-III, FIG. 4 shows an enlargement of detail Y of the flange bearing half shell illustrated in FIG. 3, FIG. 5 shows an enlargement of detail Z of detail Y illustrated in FIG. 4, FIG. 6 shows a side view of a portion of an unwelded flange bearing illustrating the method step of deflecting the thrust washer, FIG. 7 shows an enlargement of the portion illustrated in FIG. 6 of a flange bearing with a laser beam directed at the joint site to illustrate the welding process, FIG. 8 is a side view of a third embodiment of a flange bearing in the form of a flange bearing half shell with a bearing shell and two thrust washers, FIG. 9 is a longitudinally sectional view of a first embodiment of a clamping device with clamped bearing shell and clamped trust washers, FIG. 10 is a partially sectional side view of the embodiment illustrated in FIG. 9 of a clamping device, FIG. 11 is a longitudinally sectional view of a first clamping jaw of the clamping device shown in FIG. 9, FIG. 12 is a longitudinally sectional view of the receptacle of the clamping device shown in FIG. 9, FIG. 13 is a longitudinally sectional view of the second clamping jaw of the clamping device shown in FIG. 9, FIG. 14 shows detail $Z_1$ of the first clamping jaw illustrated in FIG. 11, and FIG. 15 shows detail $Z_2$ of the second clamping jaw illustrated in FIG. 13.

DETAILED DESCRIPTION

FIG. 1 is a perspective representation of a first embodiment of a flange bearing 1 in the form of a flange bearing half shell having a bearing shell 2 and two thrust washers 3. Both the bearing shell 2 and the thrust washers 3 are of layered construction, wherein the bearing shell 2 is composed of a bearing shell backing member 2' and a bearing shell facing 2" and the thrust washer 3 is composed of a thrust washer backing member 3' and a thrust washer facing 3'".

The radius of the inner circumferential surface segment 13 of the thrust washer 3 corresponds to the radius of the outer circumferential surface 12 of the bearing shell 2 substantially over the entire circumference of the thrust washer 3. The thrust washers 3 have bevels only at their ends 7. Apart from this end area of the thrust washers 3, in which the bevels are located, the thrust washers 3 are connected with the bearing shell 2 by segmental weld seams 8 at the usable joint site, which is arranged between the outer circumferential surface 12 of the bearing shell 2 and an inner circumferential surface segment 13 of the thrust washer 3.

This makes the flange bearing 1 both stable and flexible. The flexibility of the flange bearing is fiber increased circumferentially by the grooves 4 at the edge of the inner circumferential surface of the bearing shell 2. The grooves 4 reduce the cross-section of the bearing shell 2, which increases the resilience of the flange bearing 1.

In addition, the flange bearing 1 has a groove 6 in the bearing shell 2, which may serve to accommodate lubricating oil and thus as a lubricating oil reservoir.

On the outer surfaces of the thrust washers 3, which are formed by the thrust washer facing 3'", there are provided grooves 5, in order to form a load-bearing lubricant film in the axial plain bearings formed by the thrust washers 3 and to remove oil.

FIG. 2 is a side view of a second embodiment of a flange bearing 1 in the form of a flange bearing half shell having a bearing shell 2 and two thrust washers 3.

This embodiment is similar to the flange bearing half shell illustrated in FIG. 1 and likewise comprises bevels at the ends 7 of the thrust washers 3. In addition, this flange bearing half shell has grooves 4 extending circumferentially at the edge of the bearing shell 2.

In contrast to the embodiment illustrated in FIG. 1, however, this flange bearing half shell has a continuous weld seam 8', thereby further increasing the stability thereof. Thus, the trust washers 3 are welded to the bearing shell 2 substantially over their entire circumference.

FIG. 3 shows a view of the flange bearing half shell illustrated in FIG. 2 along section III-III.

The structure of the bearing shell 2, comprising a bearing shell backing member 2' and a bearing shell facing 2" applied to said backing member is easily visible. The grooves 4 arranged at the edges of the bearing shell 2 reduce the cross-section of the bearing shell 2 at the end faces of the bearing shell 2 and thus increase the flexibility of the bearing shell 2 and thus of the entire flange bearing 1.

At each edge of the bearing shell 2 there is arranged a thrust washer 3, wherein this thrust washer 3, like the bearing shell 2, is composed of various materials. The thrust washers 3 have an inner thrust washer backing member 3' and a thrust washer facing 3'" applied to said backing member, which facing 3'" points outwards, lice the end face of the bearing shell 2.

The interflange dimension Z and the check dimension W are fixed by the thrust washers 3 arranged spacedly on the bearing shell 2. The interflange dimension Z is the distance between the two thrust washers 3 in the direction of the flange bearing axis, i.e. the distance between the two thrust washer backing members 3'. On the other hand, the cheek dimension W is the distance between the two outer surfaces of the thrust washers 3 in the direction of the flange bearing axis. Thus, the cheek dimension W is the sun of the interflange dimension Z and the axial thickness of the thrust washers 3.

As has already been explained in detail, the two dimensions Z and W exhibit close tolerances, which make tough demands of the production process. In particular, these dimensions have to be as constant as possible over the height of the thrust washers 3, which may only be achieved by a the thrust washers 3 perpendicularly on the bearing shell 2. Ideally, the thrust washers 3 should form an angle of 90° with the outer circumferential surface 12 of the bearing shell 2, as illustrated in FIG. 3.

In contrast to FIGS. 1 and 2, FIG. 3 shows the weld seam 8' in cross-section. The weld seam 8', is formed at a joint site 10, which is arranged between the outer circumferential surface 12 of the bearing shell 2 and an inner circumferential surface segment 13 of the thrust washer 3. The flange bearing half shell illustrated in FIG. 3 is an externally welded flange bearing half shell. The weld seam 8' extends axially only over a part of the joint site 10 and is triangular in form.

For a fuller explanation of the weld seam 8' or the connection of thrust washer 3 and bearing shell 2, reference is made to FIG. 4, which shows an enlargement of detail Y of the flange bearing half shell illustrated in FIG. 3.

FIG. 4 reveals that the bearing shell backing member 2' is connected to the thrust washer backing member 3' by means of the weld seam 8'. The backing members 2', 3' of the bearing shell 2 and the thrust washer 3 respectively are made of weldable material, conventionally of steel, whereas the flags 2", 3'" of both the thrust washer 3 and the bearing shell 2 consist as a rule of alloys, which are not weldable. The weld seam 8' extends axially only over a part of the joint site 10, which is arranged between bearing shell 2 and thrust washer 3. Consequently, a substantially parallel gap 9 forms to the rear of the weld seam 8'.

FIG. 4 also shows the angle a which the thrust washer 3 forms with the outer circumferential surface 12 of the bearing shell 2. This angle should ideally amount to 90°, wherein in practice a value of 90°±50' (minutes) is deemed adequate. For an even more precise description of the weld seam 8' and the joint site 10, reference is made to FIG. 5, which illustrates an enlargement of detail Z of the detail Y illustrated in FIG. 4.

The joint site 10 is arranged between the outer circumferential surface 12 of the bearing shell 2 and an inner circumferential surface segment 13 of the thrust washer 3. In the exemplary embodiment illustrated in FIG. 5, the outer contour of the bearing shell 2 or of the bearing shell backing member 21 and the inner contour of the thrust washer 3 is substantially cylindrical, such that a substantially parallel gap 9 forms at the back 8'b of the weld seam 8', if the thrust washer 3 is attached perpendicularly to the bearing shell backing member 2'.

The weld seam 8' extends only over a part of the joint site 10. The weld seam 8', which has a front 8'a and a back 8'b, has a substantially triangular cross-section, tapering from the front 8'a to the back 8'b. The flange bearing half shell illustrated in FIG. 5 has been externally welded, such that the front 8'a of the weld seam 8' is on the side facing the thrust washer facing 3". On one side it borders the thrust washer facing 3" and on the other side it borders the end face 2'a of the bearing shell backing member 2'.

The weld seam axis 11 is slightly inclined in the direction of the bearing shell backing member 2', which results from the fact that the laser welding beam was not held perpendicularly to the end face 2'a, but rather likewise stood slightly inwards.

In addition, the thrust washer facing 3" is beveled slightly or provided with a chamfer in the area of the joint site 10, in order to make the joint site 10 more easily accessible to the welding beam. In addition, beveling of the thrust washer facing 3" counters the risk of the weldable facing material being introduced into the weld seam 8' during welding.

FIGS. 6 and 7 explain the method according to the invention in more detail.

FIG. 6 shows a side view of a portion of an unwelded flange bearing illustrating the method step of deflection of the thrust washer 3.

Because the orientation of the thrust washer 3 after introduction of the weld seam into the joint site 10 changes as a result of cooling, using the method according to the invention it is positioned so as to be inclined by the deflection angle $\epsilon$.

If the flange bearing is to be welded from the outside, i.e. the weld seam is arranged on the outside in the area of the end face of the bearing shell 2, the thrust washer 3 has to be tilted slightly inwards over its entire circumference, such that the thrust washer 3 forms an angle $\alpha$-$\epsilon$ with the outer circumferential surface 12 of the bearing shell 2. The deflection angle $\epsilon$ is selected in such a way that the at washer 3 rights itself by precisely this angle after the welding process and cancellation of the deflection as a result of cooling. The deflection angle $\epsilon$ is thus a means of compensating the cooling effect and the inclined position of the thrust washer 3 caused by the cooling effect.

By deflecting the thrust washer 3, a wedge-shaped gap 17 is formed at the joint site 10 between the outer circumferential surface 12 of the bearing shell 2 and the inner circumferential surface segment 13 of the thrust washer 3.

FIG. 7 shows an enlargement of the portion illustrated in FIG. 6 of a flange bearing with a laser beam 15 directed at the joint site 10 to illustrate the welding process.

The laser beam 15 is inclined inwards by the angle $\beta$ and is focused in such a way that the focal point 16 is in front of the wedge-shaped gap 17, which is formed as a result of deflection of the thrust washer 3. This makes the cross-section of the laser welding beam 15 larger than the width of the wedge-shaped gap 17, such that the parts to be joined—the thrust washer facing 3" and the bearing shell facing 2"—are heated sufficiently.

FIG. 8 is a side view of a third embodiment of a flange bearing in the form of a flange bearing half shell having a bearing shell 2 and two thrust washers 3.

The thrust washers 3 of this embodiment comprise punched out portions 14 at their inner circumferential surface segments 13. These punched-out portions 14 are uniform in construction and regularly distributed over the inner contour of the thrust washers 3. As a result of the punched-out portions 14, the thrust washer 3 may be connected with the bearing shell 2 via segmental weld seams 8 only, wherein a segmental weld seam 8 is arranged between every two punched-out portions 14.

The punched-out portions 14 increase the flexibility of the flange bearing. Such flange bearings are suitable above all for applications in which the flange bearings are exposed to constant vibrations, which may in this way be better cushioned or compensated.

FIG. 9 is a longitudinally sectional view of a first embodiment of a clamping device 18. The clamping device 18 comprises a receptacle 19 and two clamping jaws 20, 21. In addition, the clamping device 18 has two clamping elements 22, 23.

The clamping device 18 is attached via two pins 26 to a clamping plate 28, wherein the two pins 26 are accommodated by two bores 27 and these bores 27 penetrate both the clamping plate 28 and the entire clamping device 18, i.e. from the clamping plate 28 via the second clamping jaw 20 and the receptacle 19 to the first clamping jaw 21.

A bearing shell 2 is arranged in a first recess in the receptacle 19. In two further recesses provided at the end faces of the receptacle 19, two it washers 3 are arranged and clamped by means of the two clamping jaws 20, 21 and a clamping element 22. A further clamping element 23 serves to fix the bearing shell 2 in the receptacle 19.

The second clamping element 22, with which the two clamping jaws 20, 21 are connected with the receptacle 19 arranged therebetween, requires a receptacle 22'. This receptacle 22' extends from the first clamping jaw 21 via the receptacle 19 to the second clamping jaw 20, wherein the second clamping element 22 takes the form of a screw in the exemplary embodiment illustrated in FIG. 9, and in the second clamping jaw 20 there is provided a thread corresponding to this screw 22, via which forces may be introduced into the clamping device 18.

FIG. 10 is a partially sectional side view of the clamping device 18 illustrated in FIG. 9.

In this representation, the circular ring-shaped construction of the individual elements of the clamping device 18 is revealed, which corresponds to the external shape of the bearing shell 2 and the thrust washers 3.

FIG. 10 also shows the means with which the bearing shell 2 is clamped in the receptacle. The bearing half shell 2 inserted into the receptacle abuts at its one end against a limit stop 23', which is formed in the present exemplary embodiment by a screw and a stop plate. The bearing shell 2 inserted thus into the receptacle is then clamped with the first clamping element 23 at its other end.

Together with the limit stop 23', the first clamping element 23 introduces prestressing forces circumferentially into the bearing shell 2 and in this way presses the bearing shell 2 against the previously clamped thrust washers 3, such that, prior to performing the weld process, a sufficiently high surface pressure is generated between the outer circumferential surface of the bearing shell and the inner circumferential surface segments of the thrust washers 3.

FIGS. 11, 12 and 13 illustrate the essential elements of the clamping device.

FIG. 11 is a longitudinally sectional view of the second clamping jaw 20 of the clamping device shown in FIG. 9, comprising a part of the receptacle 22' for the second clamping element, wherein this receptacle takes the form of a thread in the area of the second clamping jaw 20.

FIG. 12 is a longitudinally sectional view of the receptacle 19 of the clamping device shown in FIG. 9. The receptacle 19 likewise comprises a part of the receptacle 22' for the second clamping element, wherein this receptacle 22' is constructed as a through-hole in the area of the receptacle 19. In addition, the receptacle 19 has a first recess 24 for accommodating a bearing shell. This recess 24 takes the form of a segment of a circle and corresponds to the external shape of the bearing shell to be accommodated.

In addition, the receptacle 19 has two filter recesses 25a, 25b for accommodating thrust washers. These recesses 25a, 25b are arranged at the end faces of the receptacle 19 and are open towards the end faces.

So that the thrust washers accommodated by these recesses 25a, 25b are inclined over their entire circumference by the deflection angle $\epsilon$ relative to perpendicular in the clamped state, the end faces 25a', 25b' of the recesses 25a, 25b are inclined relative to perpendicular in each case by the deflection angle $\epsilon$. The ends of one end face 25a', 25b' in each case exhibit an axial offset a of 0.05 mm in the example of a receptacle illustrated in FIG. 12.

If the circular ring-shaped thrust washer has an internal diameter of 70.1 mm and an external diameter of 84.88 mm for example, an axial offset of 0.05 mm of the ends of the end face results in a deflection angle $\epsilon$ of approximately half a degree or 30 minutes, taking into account a chamfer 30 of 2×45°. The axial offset a is also illustrated in FIG. 12 for both recesses 25a, 25b or for the two end faces 25a', 25b' of these two recesses.

FIG. 13 is a longitudinally sectional view of the first clamping jaw 21 of the clamping device shown in FIG. 9. This clamping jaw 21 also comprises part of the receptacle 22' of the second clamping element.

FIGS. 14 and 15 show details $Z_1$ and $Z_2$ of FIGS. 11 and 13 respectively.

FIG. 14 shows detail $Z_1$ of the second clamping jaw 20 illustrated in FIG. 11, enlarged by 5:1. The Figure reveals that the second clamping jaw 20 also comprises a recess 20a, which exhibits a smaller depth than the recesses of the receptacle 19 illustrated in FIG. 12.

As already explained with reference to FIG. 12, the end face 20a' of the recess 20a is inclined relative to perpendicular by the deflection angle $\epsilon$. The two ends of the end face 20a' comprise an axial offset a for this purpose. If the recess 20a of the second clamping jaw 20 extends by the same amount in the radial direction as the receptacle recess corresponding thereto, the axial offset a of the two ends of the end face 20a' of the recess 20a is equal to the axial offset a of the end face of the receptacle recess.

In the exemplary embodiment of a clamping device illustrated in FIGS. 9 to 15, the axial offset of the ends of the end surface 20a', 21a', 25a', 25b' of the recesses 20a, 21a, 25a, 25b is equal in size and amounts for the exemplary embodiment already mentioned to 0.05 mm.

FIG. 15 shows, corresponding to FIG. 14, the detail $Z_2$ of the first clamping jaw 21 illustrated in FIG. 13, enlarged by 5:1.

The statements made with reference to FIG. 14 may be applied to FIG. 15, wherein the first clamping jaw 21 has a recess 21a and an end face 21a'.

The invention claimed is:

1. A flange bearing comprising a bearing shell and at least one thrust washer, the at least one thrust washer being attached to a convex outer circumferential surface of the bearing shell, wherein a joint site extends between the convex outer circumferential surface of the bearing shell and a concave inner circumferential surface of the thrust washer, the at least one thrust washer being welded along a weld seam to the bearing shell in such a manner as to remain joined permanently during operation, the weld seam extending axially over only a part of the joint site from an end face of the bearing shell away from an outer thrust facing of the thrust washer, and without post-machining an angle is defined between the at least one thrust washer and the outer circumferential surface of the bearing shell having a value of 90° ±50' (minutes), wherein a radial gap extends from said weld seam axially between the convex outer circumferential surface of the bearing shell and the concave inner circumferential surface of the thrust washer.

2. A flange bearing according to claim 1, wherein the inner circumferential surface segment of the thrust washer has a radius that corresponds to a radius of the outer circumferential surface of the bearing shell substantially over the entire circumference of the thrust washer.

3. A flange bearing according to claim 1, wherein the at least one thrust washer is laser-welded to the bearing shell.

4. A flange bearing according to claim 1, wherein the at least one thrust washer is welded to the bearing shell over substantially the entire circumference of the thrust washer.

5. A flange bearing according to claim 1, wherein the flange bearing is welded from an outside of the flange bearing, such that the weld seam which comprises a back and a front, has its front on the side facing a thrust washer facing of the thrust washer.

6. A flange bearing according to claim 1, wherein the flange bearing is welded from an inside of the flange bearing, such that the weld seam, which comprises a back and a front, has its front on the side remote from an axially outer thrust washer facing.

7. A flange bearing according to claim 1, wherein the bearing shell comprises at least one circumferentially encircling groove on an inner circumferential surface of the bearing shell.

8. A flange bearing according to claim 1, wherein the bearing shell comprises at least one groove on an inner circumferential surface of the bearing shell.

9. A flange bearing in the form of a flange bearing half shell, with two thrust washers according to claim 1, wherein two thrust washers extend circumferentially at least in part beyond the bearing shell.

10. A flange bearing according to claim 1, wherein the thrust washer comprises punched out portions at an inner circumferential surface segment.

11. A flange bearing comprising a bearing shell and at least one thrust washer, the bearing shell having at least one circumferentially extending groove having a width extending axially inwardly from an edge of an inner circumferential surface with a chamfer portion and plane portion reducing the axial cross section of the bearing shell at the edge, the at least one thrust washer being attached to a convex outer circumferential surface of the bearing shell radially outwardly from said at least one groove, wherein a joint site extends between the convex outer circumferential surface of the bearing shell and a concave inner circumferential surface of the thrust washer, the at least one thrust washer being welded along a weld seam to the bearing shell in such a manner as to remain joined permanently during operation, the weld seam extending along the convex outer surface of the bearing shell between the rear side of the plane portion of the at least one groove and the concave inner circumferential surface of the thrust washer to increase the resiliency of the flange bearing and extending axially over only a part of the joint site terminating prior to said chamfer portion with a radial gap extending axially from the weld seam between said convex outer surface and said concave inner surface of the thrust washer, and without post-machining an angle is defined between the at least one thrust washer and the outer circumferential surface of the bearing shell having a value of 90° ±50' (minutes).

12. A flange bearing comprising a bearing shell and at least one thrust washer, the at least one thrust washer being attached to an outer convex circumferential surface of the bearing shell, wherein a joint site extends between the convex outer circumferential surface of the bearing shell and a concave inner circumferential surface of the thrust washer, the at least one thrust washer being welded along a weld seam to the bearing shell in such a manner as to remain joined permanently during operation, the weld seam extending axially between an outer thrust facing and an opposite inner surface of the at least one thrust washer and extending over only a part of the concave inner circumferential surface and terminating prior to the inner surface of the thrust washer, wherein the convex outer circumferential surface of the bearing shell is spaced from and substantially parallel to the concave inner circumferential surface of the thrust washer.

* * * * *